US012031376B2

(12) United States Patent
Storck, III et al.

(10) Patent No.: US 12,031,376 B2
(45) Date of Patent: Jul. 9, 2024

(54) MAGNETIC ANTI-RATTLE DEVICE OF TELESCOPING MULTI-PANEL DOOR

(71) Applicant: GM GLOBAL TECHNOLOGY OPERATIONS LLC, Detroit, MI (US)

(72) Inventors: Phillip C. Storck, III, Washington, MI (US); Jess McCafferty, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 17/680,582

(22) Filed: Feb. 25, 2022

(65) Prior Publication Data

US 2023/0272656 A1 Aug. 31, 2023

(51) Int. Cl.
*E05F 5/02* (2006.01)

(52) U.S. Cl.
CPC ......... *E05F 5/027* (2013.01); *E05Y 2201/412* (2013.01); *E05Y 2201/684* (2013.01); *E05Y 2600/45* (2013.01); *E05Y 2800/21* (2013.01); *E05Y 2900/132* (2013.01)

(58) Field of Classification Search
CPC .... E05F 5/027; E05F 5/06; E05F 7/00; E05Y 2201/412; E05Y 2201/684; E05Y 2600/45; E05Y 2800/21; E05Y 2900/132; E05Y 2201/46; E05Y 2800/422; E05Y 2900/531; E05Y 2900/142; B60R 13/08; E05D 15/0656; E05D 2015/0695
See application file for complete search history.

(56) References Cited

U.S. PATENT DOCUMENTS

| | | | | |
|---|---|---|---|---|
| 2004/0231244 | A2* | 11/2004 | Kalempa | E06B 7/16 49/478.1 |
| 2007/0234641 | A1* | 10/2007 | Delgado | E05D 15/063 49/141 |

FOREIGN PATENT DOCUMENTS

| | | | | | |
|---|---|---|---|---|---|
| CN | 108118993 | A | * | 6/2018 | E05D 13/00 |
| JP | H0583255 | U | * | 11/1993 | |
| JP | H0583258 | U | * | 11/1993 | |
| JP | 2559745 | Y2 | * | 1/1998 | |
| JP | 2002129824 | A | * | 5/2002 | |
| JP | 2014237928 | A | * | 12/2014 | |
| KR | 0121656 | Y1 | * | 8/1998 | |
| KR | 100527432 | B1 | * | 11/2005 | |
| KR | 20110116171 | A | * | 10/2011 | |
| NL | 8600609 | A | * | 10/1987 | E05D 15/06 |
| NO | 118812 | B | * | 2/1970 | |

* cited by examiner

*Primary Examiner* — Lori Lyjak
(74) *Attorney, Agent, or Firm* — CANTOR COLBURN LLP

(57) ABSTRACT

A door assembly of a vehicle includes a first door panel located in a first guide groove and movable at least partially across a door opening from a first side of the door opening toward a second side of the door opening, and a second door panel spaced apart from the first door panel and located in a second guide groove. The second door panel is movable at least partially across the door opening from the first side toward the second side. One or more first magnetic elements are located at the first door panel, and one or more second magnetic elements disposed at the second door panel. A magnetic force between the one or more first magnetic elements and the one or more second magnetic elements urges the first door panel into contact with a sidewall of the first guide groove.

18 Claims, 8 Drawing Sheets

MAGNETIC ANTI-RATTLE DEVICE OF TELESCOPING MULTI-PANEL DOOR

INTRODUCTION

The subject disclosure relates to vehicle doors, and in particular to multi-panel sliding door systems for vehicles.

Some vehicles, such as trucks with enclosed cargo compartments, have a dividing wall separating the passenger compartment from the cargo compartment. A door is often included in the dividing wall to allow access for the vehicle driver to the cargo compartment. In some such vehicles, the door is hinged, while in other vehicles, the door is a sliding door or pocket door configuration. It is desired for the driver or other user to be able to operate the door with minimal effort, to move the door between a closed position and an opened position. Further, it is desired to prevent noise and vibration of the door.

SUMMARY

In one embodiment, a door assembly of a vehicle includes a first door panel located in a first guide groove and movable at least partially across a door opening from a first side of the door opening toward a second side of the door opening, and a second door panel spaced apart from the first door panel and located in a second guide groove. The second door panel is movable at least partially across the door opening from the first side toward the second side. One or more first magnetic elements are located at the first door panel, and one or more second magnetic elements disposed at the second door panel. A magnetic force between the one or more first magnetic elements and the one or more second magnetic elements urges the first door panel into contact with a sidewall of the first guide groove.

Additionally or alternatively, in this or other embodiments the magnetic force between the one or more first magnetic elements and the one or more second magnetic elements urges the second door panel into contact with a sidewall of the second guide groove.

Additionally or alternatively, in this or other embodiments the magnetic force is repulsive.

Additionally or alternatively, in this or other embodiments the magnetic force is attractive.

Additionally or alternatively, in this or other embodiments the one or more first magnetic elements are located at a bottom portion of the first door panel, and the one or more second magnetic elements are located at a bottom portion of the second door panel.

Additionally or alternatively, in this or other embodiments the one or more first magnetic elements are a plurality of first magnetic elements arrayed along the first door panel in a door travel direction.

Additionally or alternatively, in this or other embodiments the one or more second magnetic elements are a plurality of second magnetic elements arrayed along the second door panel in the door travel direction.

Additionally or alternatively, in this or other embodiments the magnetic force is configured to prevent one or more of noise or vibration of the first door panel and the second door panel.

In another embodiment a vehicle includes a first compartment, a second compartment and a dividing wall separating the first compartment from the second compartment. A door assembly is located at a door opening in the dividing wall. The door assembly includes a first door panel located in a first guide groove and movable at least partially across a door opening from a first side of the door opening toward a second side of the door opening. A second door panel is spaced apart from the first door panel and located in a second guide groove. The second door panel is movable at least partially across the door opening from the first side toward the second side. One or more first magnetic elements are located at the first door panel, and one or more second magnetic elements are located at the second door panel. A magnetic force between the one or more first magnetic elements and the one or more second magnetic elements urges the first door panel into contact with a sidewall of the first guide groove.

Additionally or alternatively, in this or other embodiments the magnetic force between the one or more first magnetic elements and the one or more second magnetic elements urges the second door panel into contact with a sidewall of the second guide groove.

Additionally or alternatively, in this or other embodiments the magnetic force is repulsive.

Additionally or alternatively, in this or other embodiments the magnetic force is attractive.

Additionally or alternatively, in this or other embodiments the one or more first magnetic elements are located at a bottom portion of the first door panel, and the one or more second magnetic elements are located at a bottom portion of the second door panel.

Additionally or alternatively, in this or other embodiments the one or more first magnetic elements are a plurality of first magnetic elements arrayed along the first door panel in a door travel direction.

Additionally or alternatively, in this or other embodiments the one or more second magnetic elements are a plurality of second magnetic elements arrayed along the second door panel in the door travel direction.

Additionally or alternatively, in this or other embodiments the magnetic force is configured to prevent one or more of noise or vibration of the first door panel and the second door panel.

Additionally or alternatively, in this or other embodiments the first compartment is a passenger compartment and the second compartment is a cargo compartment.

Additionally or alternatively, in this or other embodiments the second compartment is an enclosed cargo compartment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
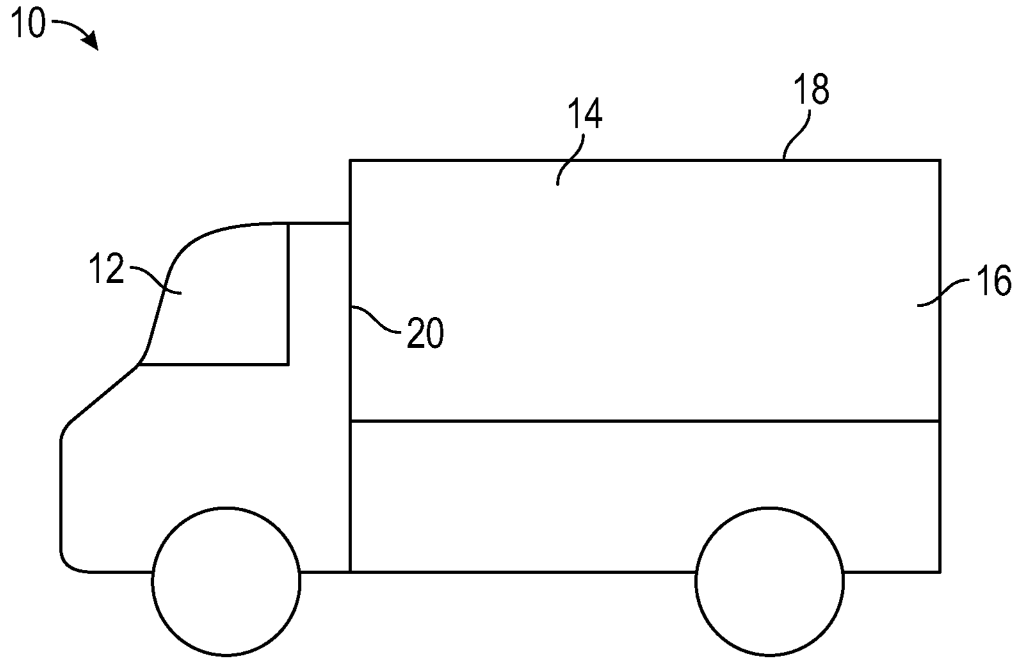
FIG. 1 is a view of an embodiment of a vehicle.

The following description is merely exemplary in nature and is not intended to limit the present disclosure, its application or uses. It should be understood that throughout the drawings, corresponding reference numerals indicate like or corresponding parts and features.

Figure 2:
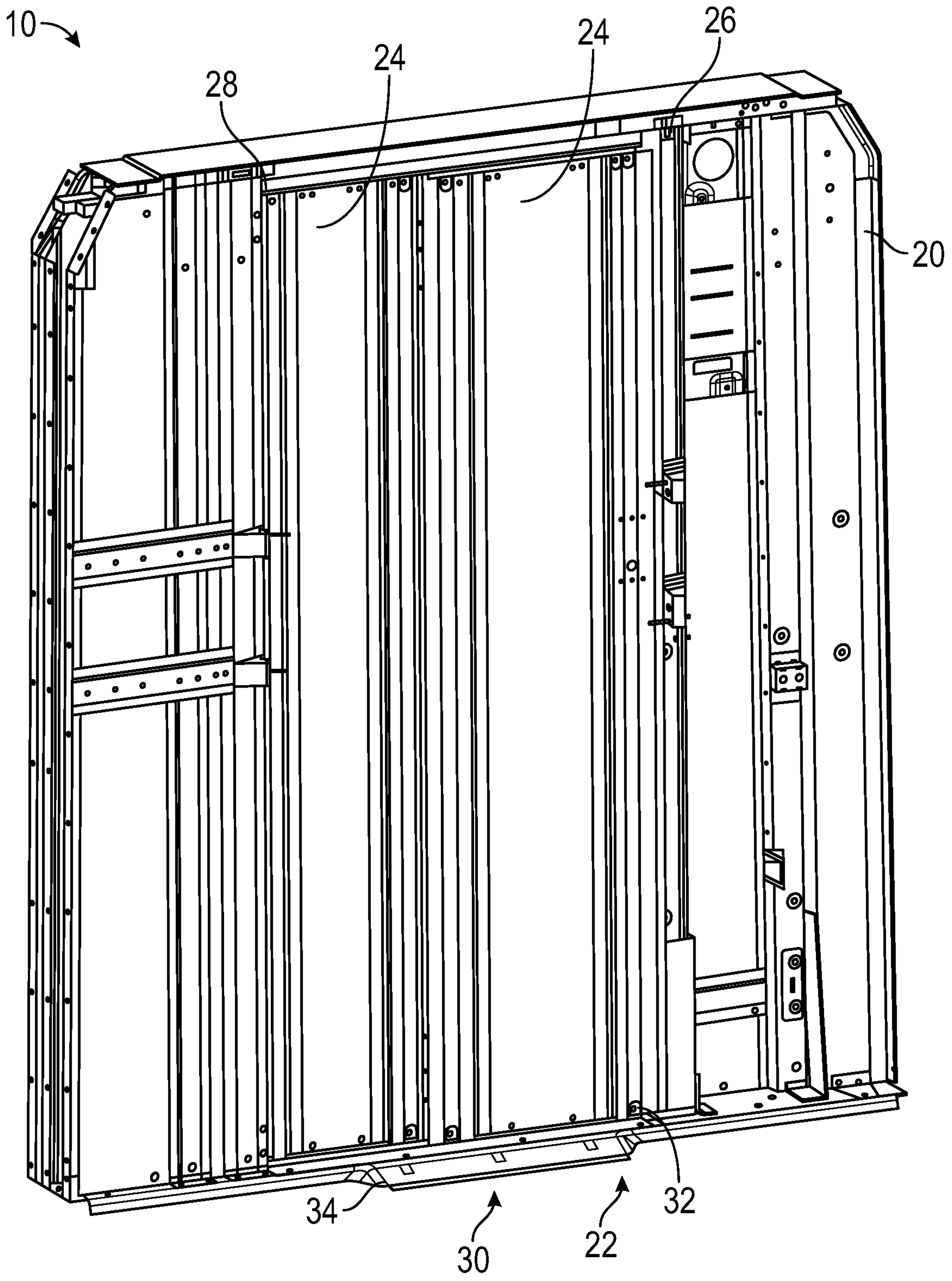
FIG. 2 is a perspective view of an embodiment of a vehicle portion including a door assembly in a closed position.
Figure 3:
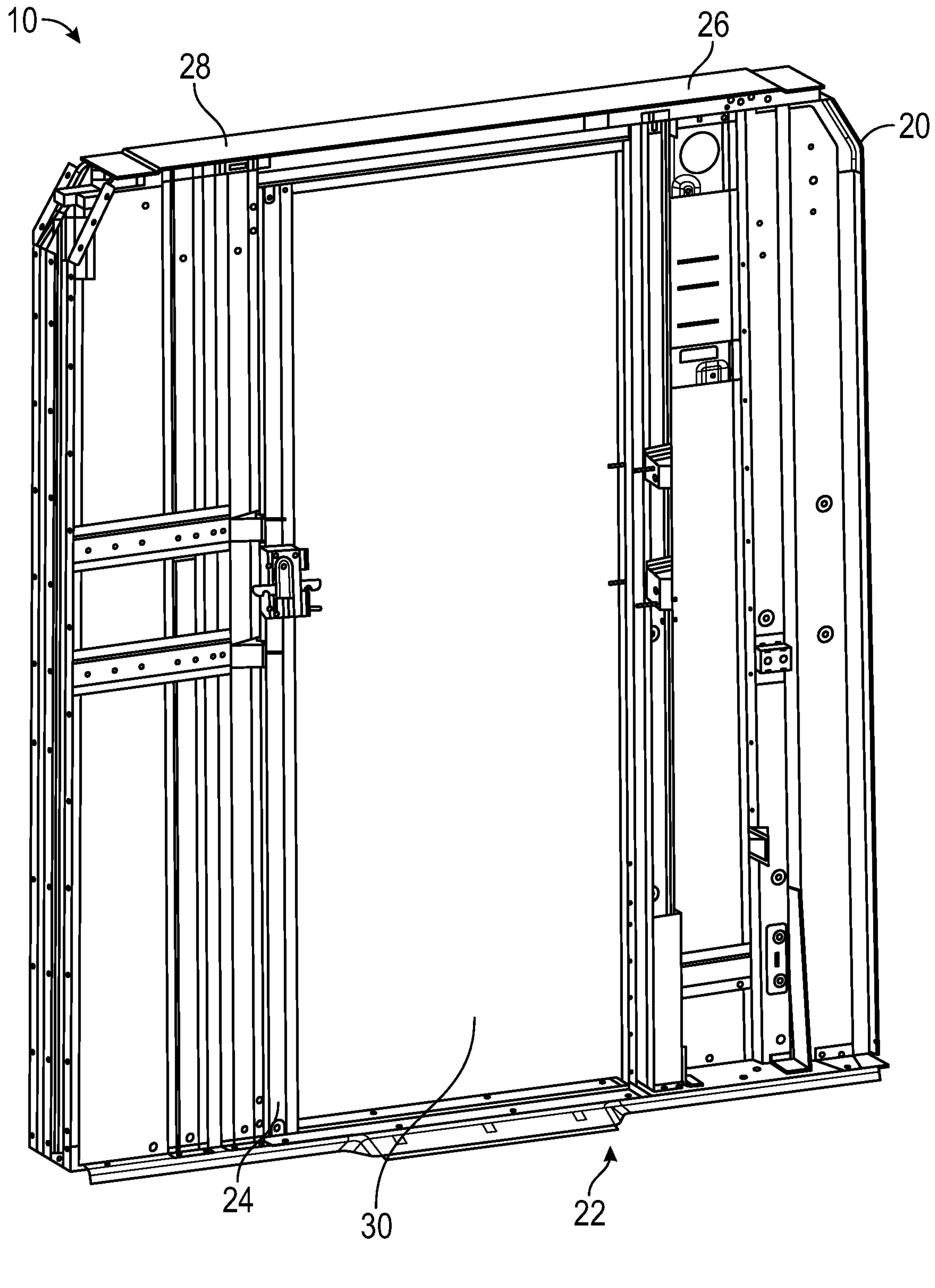
FIG. 3 is a perspective view of an embodiment of a vehicle including a door assembly in an opened position.

In accordance with an exemplary embodiment, a vehicle 10 is illustrated in FIG. 1. The vehicle 10 includes a passenger compartment 12 from which a user drives the vehicle 10. Further, the vehicle 10 includes a cargo compartment 14 which, in some embodiments, is an enclosed cargo compartment 14, having side walls 16 and a roof 18. Referring to FIG. 2, the vehicle 10 includes a dividing wall 20 between the passenger compartment 12 and the cargo compartment 14. To allow the user to easily move between the passenger compartment 12 and the cargo compartment 14 without exiting the vehicle 10, a door assembly 22 is located in the dividing wall 20. The door assembly 22 is a multi-panel sliding door assembly having two or more door panels 24. The door panels 24 are moveable between a first side 26 and a second side 28 of a door opening 30, and between a closed position relative to the door opening 30 illustrated in FIG. 2 and an opened position as illustrated in FIG. 3.

Figure 4:
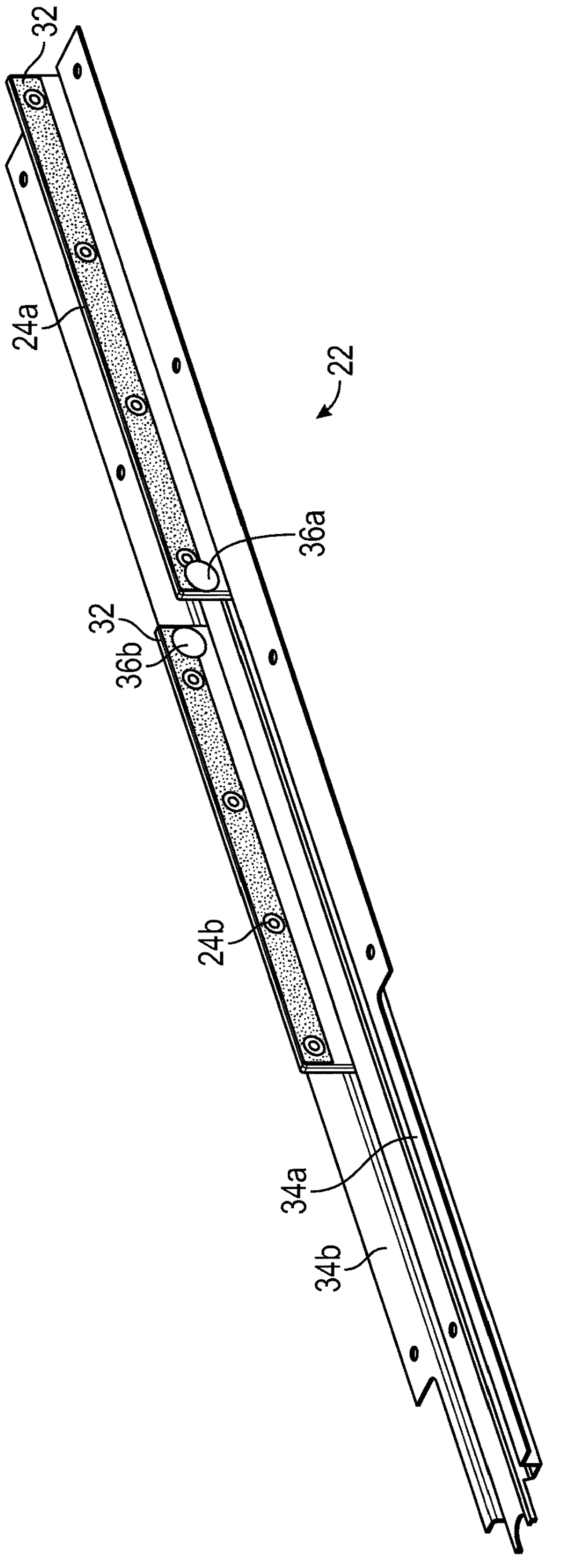
FIG. 4. is a perspective view of an embodiment of a guide groove for a door assembly.

Referring now to FIG. 4, in some embodiments a bottom end 32 of each door panel 24 is located in a guide groove 34 of the vehicle. A first door panel 24*a* is located in a first guide groove 34*a*, while a second door panel 24*b* is located in a second guide groove 34*b*, which is spaced apart from the first guide groove 34*a*. The guide grooves 34*a* and 34*b* aid in positioning the door panels 24*a*, 24*b* and are utilized to guide the door panels 24*a*, 24*b* between the opened position and the closed position. Each of the door panels 24*a*, 24*b* include magnetic elements 36, which as described in more detail below are utilized to reduce noise and vibration, or rattle, of the door panels 24*a*, 24*b*. In some embodiments, the magnetic elements 36 are permanent magnets, while in other embodiments the magnetic elements 36 are electromagnets which may be selectably or automatically activated depending on, for example, positions of the door panels 24. Additionally, select magnetic elements 36 may be replaced by, for example, magnetic steel plates embedded in or attached to the door panel 24.

Figure 5:
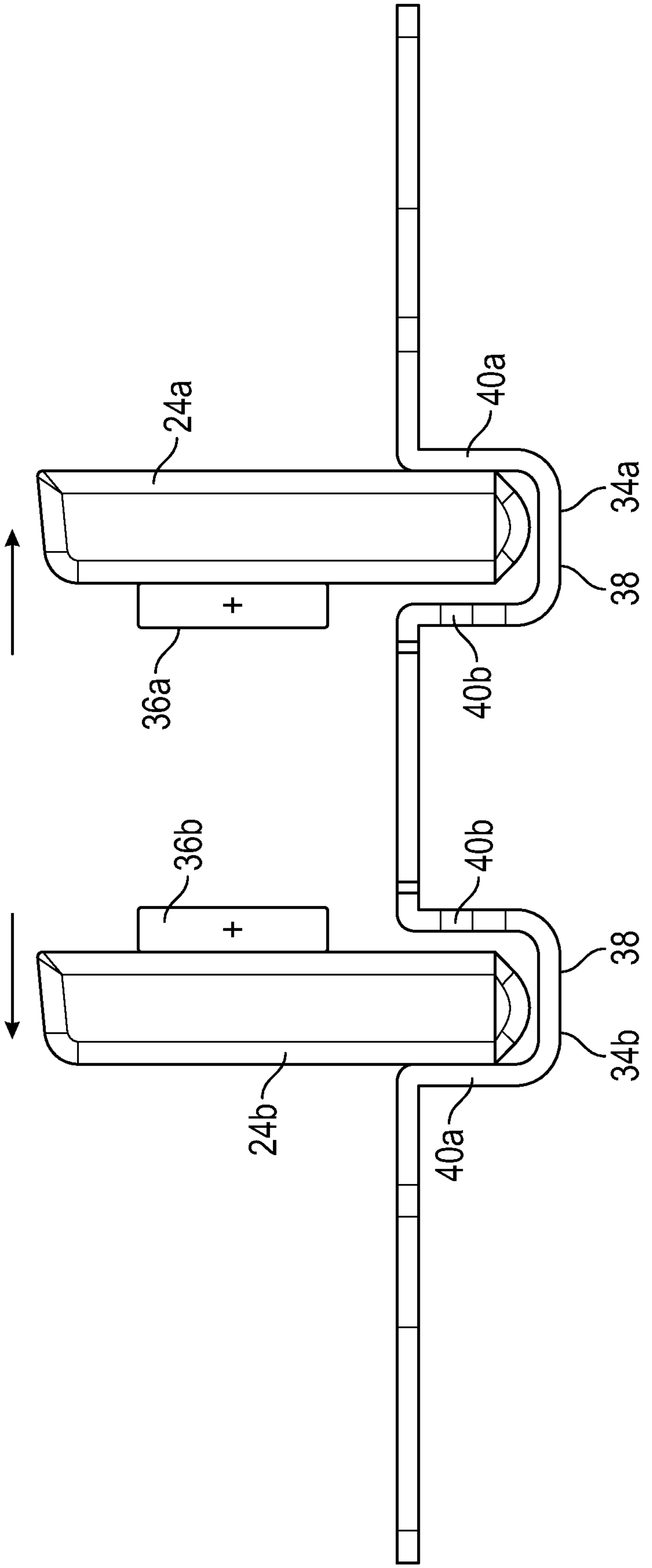
FIG. 5 is a cross-sectional view of an embodiment of a door assembly with magnetic elements.

Referring to FIG. 5, shown is a cross-sectional view of bottom ends 32 of the door panels 24*a*, 24*b* and their respective magnetic elements 36*a*, 36*b* disposed in guide grooves 34*a* and 34*b*. Each guide groove 34 has a groove base 38 and opposing groove sidewalls 40 extending from the groove base 38 to define the guide groove 34. In the embodiment of FIG. 5, the door panels 24 are located between the groove sidewalls 40. The magnetic elements 36*a*, 36*b* are oriented such that a positive pole of the first magnetic element 36*a* faces a positive pole of the second magnetic element 36*b*. The magnetic elements 36*a* and 36*b* thus repel each other, and force the door panels 24*a* and 24*b* into contact with respective sidewalls 40*a* of the guide grooves 34*a* and 34*b*. Holding the door panels 24*a* and 24*b* in contact with the sidewalls 40*a* of the guide grooves 34*a* and 34*b* via the repulsive magnetic interaction of magnetic elements 36*a* and 36*b* reduces noise and vibration of the door panels 24*a* and 24*b*. While in the embodiment of FIG. 5, the positive poles face each other, one skilled in the art will readily appreciate that in other embodiments the magnetic elements 36*a* and 36*b* are oriented such that the negative poles face each other.

Figure 6:
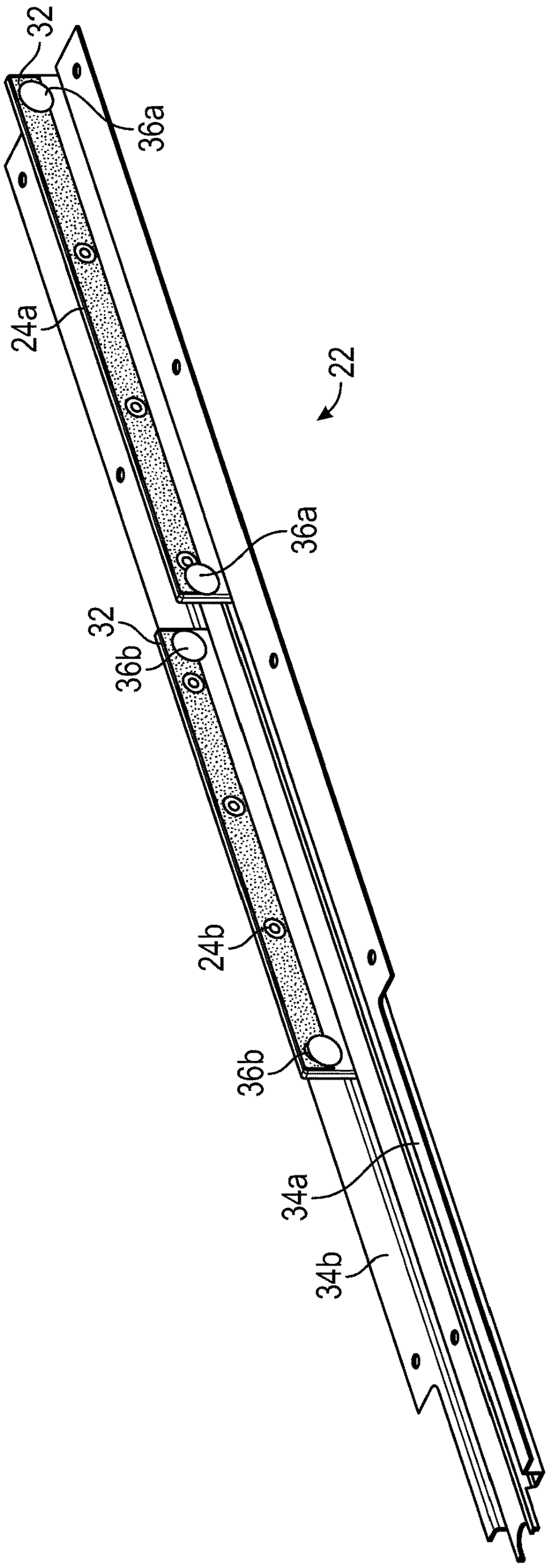
FIG. 6 is a perspective view illustrating a plurality of magnetic elements at a door panel.

Referring again to FIG. 4, in some embodiments, magnetic elements 36*a* and 36*b* are located at opposing ends of their respective door panels 24*a* and 24*b* to prevent vibration or rattle when the door assembly 22 is in the fully closed position. In another embodiment, illustrated in FIG. 6, magnetic elements 36*a* and 36*b* are located at each end of their respective door panels 24*a* and 24*b* to prevent vibration or rattle when the door assembly 22 is in either of the fully closed position or the fully opened position.

Figure 7:
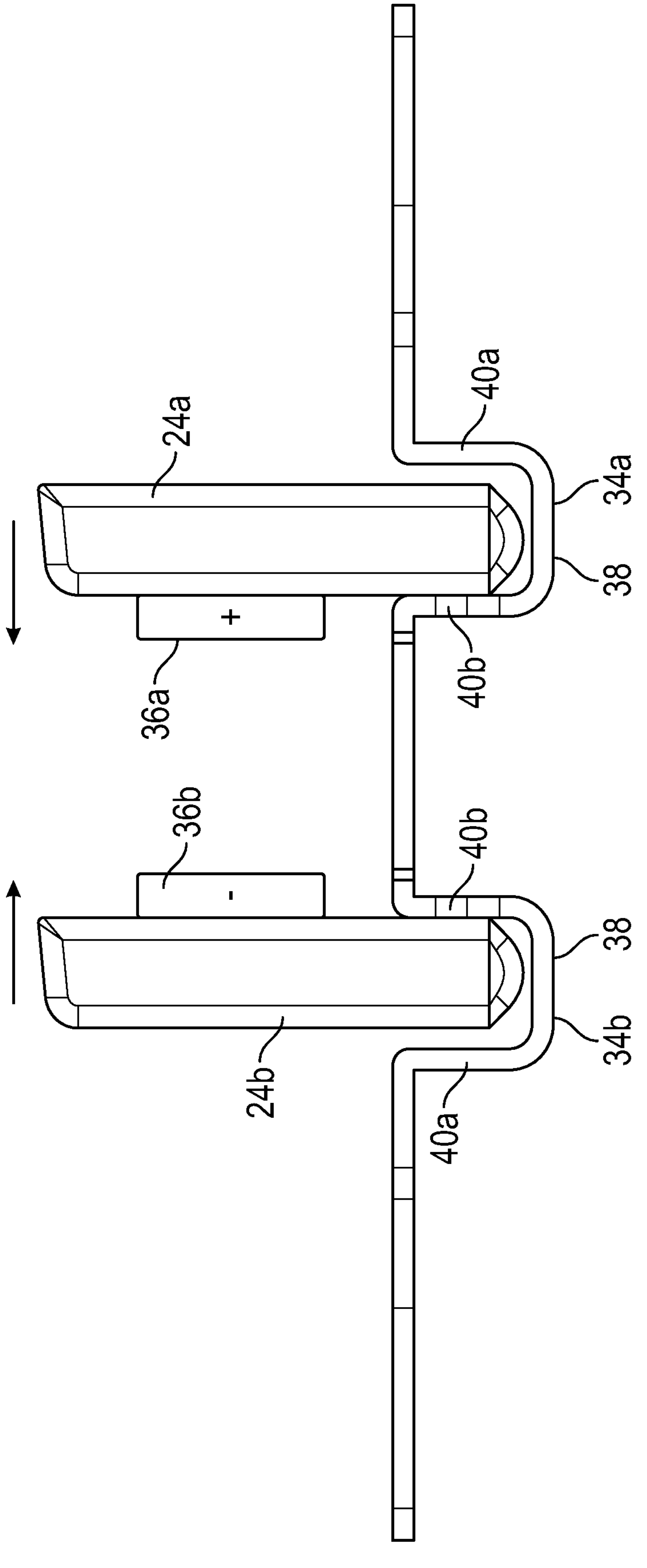
FIG. 7 is a cross-sectional view of another embodiment of a door assembly with magnetic elements.

While in the embodiment of FIG. 5 the magnetic elements 36*a* and 36*b* are arranged to repel each other, in another configuration shown in FIG. 7 the magnetic elements 36*a* and 36*b* have opposite polarities so that the magnetic elements 36*a* and 36*b* are attractive, and urge the door panels 24*a* and 24*b* into contact with respective groove sidewalls 40*b* of the respective guide grooves 34*a* and 34*b* to prevent noise and vibration of the door panels 24*a* and 24*b* in the respective guide grooves 34*a* and 34*b* via the magnetic attractive interaction between the magnetic elements 36*a* and 36*b*.

Figure 8:
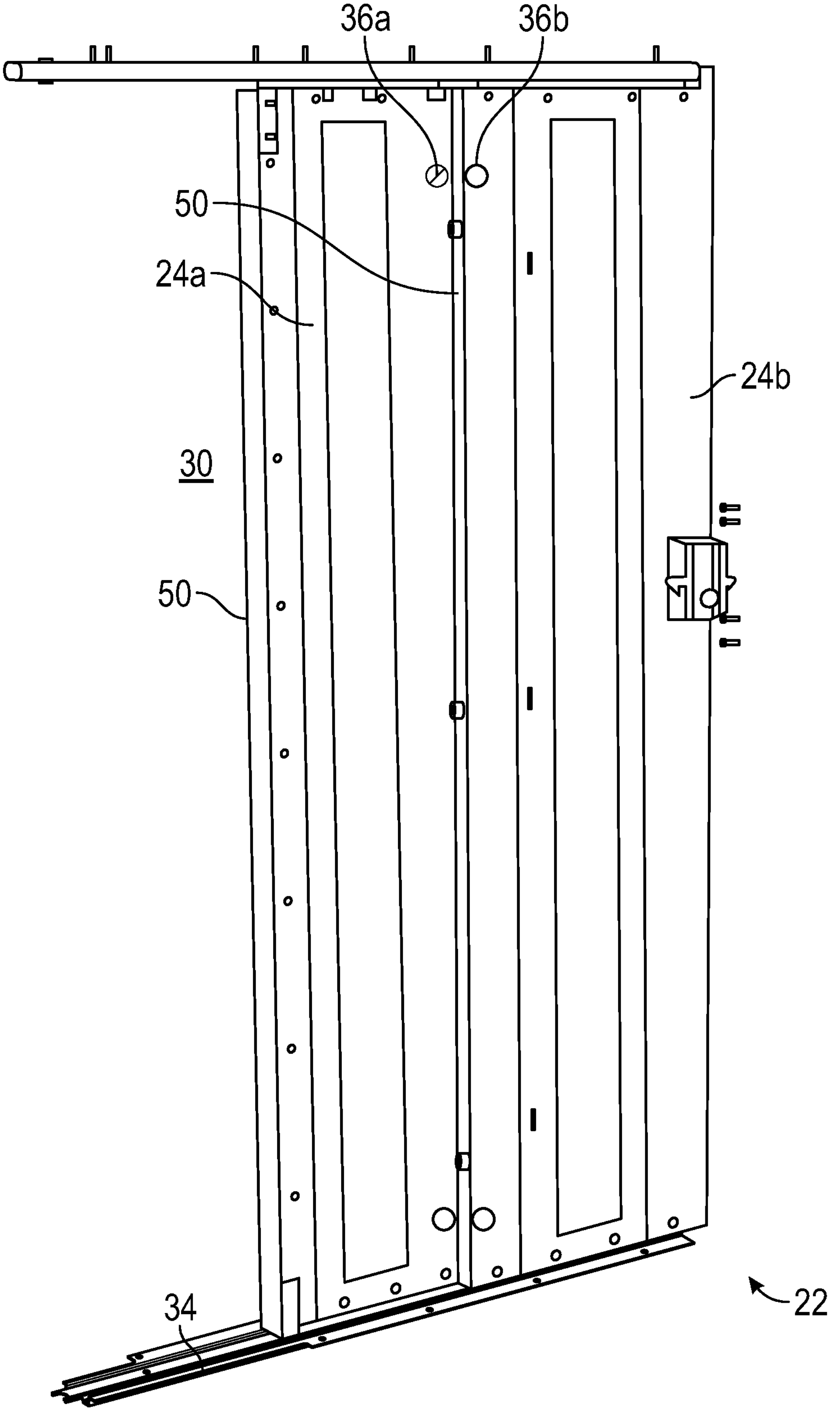
FIG. 8 is a perspective view of another embodiment of a door assembly with magnetic elements.

Referring now to FIG. 8, while in other embodiments the magnetic elements 36 are located at the bottom end 32 of the door panels 24 at or near the guide grooves 34, in other embodiments the magnetic elements 36*a* and 36*b* are located at an upright edge 50 of the respective door panels 24*a* and 24*b*.

The configurations described herein utilize magnetic interaction of the magnetic elements 36*a* and 36*b* to reduce noise and vibration, or rattle, of the door panels 24*a* and 24*b* of the door assembly 22 in the vehicle 10.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A door assembly of a vehicle, comprising:

a first door panel disposed in a first guide groove and movable at least partially across a door opening from a first side of the door opening toward a second side of the door opening;

a second door panel spaced apart from the first door panel and disposed in a second guide groove, the second door panel movable at least partially across the door opening from the first side toward the second side;

one or more first magnetic elements disposed at the first door panel; and one or more second magnetic elements disposed at the second door panel, wherein a magnetic force between the one or more first magnetic elements and the one or more second magnetic elements urges the first door panel into contact with a sidewall of the first guide groove.

2. The door assembly of claim 1, wherein the magnetic force between the one or more first magnetic elements and the one or more second magnetic elements urges the second door panel into contact with a sidewall of the second guide groove.

3. The door assembly of claim 1, wherein the magnetic force is repulsive.

4. The door assembly of claim 1, wherein the magnetic force is attractive.

5. The door assembly of claim 1, wherein:

the one or more first magnetic elements are disposed at a bottom portion of the first door panel; and the one or more second magnetic elements are disposed at a bottom portion of the second door panel.

6. The door assembly of claim 1, wherein the one or more first magnetic elements are a plurality of first magnetic elements arrayed along the first door panel in a door travel direction.

7. The door assembly of claim 6, wherein the one or more second magnetic elements are a plurality of second magnetic elements arrayed along the second door panel in the door travel direction.

8. The door assembly of claim 1, wherein the magnetic force is configured to prevent one or more of noise or vibration of the first door panel and the second door panel.

9. A vehicle, comprising:

a first compartment;

a second compartment;

a dividing wall separating the first compartment from the second compartment;

a door assembly disposed at a door opening in the dividing wall, the door assembly including:

a first door panel disposed in a first guide groove and movable at least partially across a door opening from a first side of the door opening toward a second side of the door opening;

a second door panel spaced apart from the first door panel and disposed in a second guide groove, the second door panel movable at least partially across the door opening from the first side toward the second side;

one or more first magnetic elements disposed at the first door panel; and one or more second magnetic elements disposed at the second door panel;

wherein a magnetic force between the one or more first magnetic elements and the one or more second magnetic elements urges the first door panel into contact with a sidewall of the first guide groove.

10. The vehicle of claim 9, wherein the magnetic force between the one or more first magnetic elements and the one or more second magnetic elements urges the second door panel into contact with a sidewall of the second guide groove.

11. The vehicle of claim 9, wherein the magnetic force is repulsive.

12. The vehicle of claim 9, wherein the magnetic force is attractive.

13. The vehicle of claim 9, wherein:

the one or more first magnetic elements are disposed at a bottom portion of the first door panel; and the one or more second magnetic elements are disposed at a bottom portion of the second door panel.

14. The vehicle of claim 9, wherein the one or more first magnetic elements are a plurality of first magnetic elements arrayed along the first door panel in a door travel direction.

15. The vehicle of claim 14, wherein the one or more second magnetic elements are a plurality of second magnetic elements arrayed along the second door panel in the door travel direction.

16. The vehicle of claim 9, wherein the magnetic force is configured to prevent one or more of noise or vibration of the first door panel and the second door panel.

17. The vehicle of claim 9, wherein the first compartment is a passenger compartment and the second compartment is a cargo compartment.

18. The vehicle of claim 17, wherein the second compartment is an enclosed cargo compartment.

* * * * *